Feb. 8, 1966   L. L. RAKOCZI ETAL   3,234,520
DATA PROCESSING SYSTEM
Filed May 25, 1961   7 Sheets-Sheet 1

INVENTORS
LASZLO L. RAKOCZI &
FUH LIN WANG
BY Samuel Cohen
Attorney

INVENTORS
LASZLO L. RAKOCZI &
FUH LIN WANG
BY
Attorney

Feb. 8, 1966    L. L. RAKOCZI ETAL    3,234,520
DATA PROCESSING SYSTEM
Filed May 25, 1961    7 Sheets-Sheet 6

INVENTORS
LASZLO L. RAKOCZI &
FUH LIN WANG
By Samuel Cole
Attorney

INVENTORS
LASZLO L. RAKOCZI &
FUH LIN WANG
BY
Attorney

United States Patent Office 3,234,520
Patented Feb. 8, 1966

3,234,520
DATA PROCESSING SYSTEM
Laszlo L. Rakoczi, Merchantville, and Fuh-Lin Wang, Levittown, N.J., assignors to Radio Corporation of America, a corporation of Delaware
Filed May 25, 1961, Ser. No. 112,677
3 Claims. (Cl. 340—172.5)

The present invention relates to digital data processing systems. More particularly, the invention relates to a data processing system in which machine instructions are executed at relatively high speeds.

Brief description of problem

A modern digital computer stores in its memory both data words and instruction words. One, or several instruction words taken together, contain, in coded form, information as to a desired computer operation, how it is to be performed, the addresses in the memory of the data words on which the operation is to be performed, the addresses in the memory where the results of the operation are to be stored, and so on. A programmer may direct the computer to perform a desired operation by programming the computer to transfer one or more instruction words stored in the memory to a unit known as an instruction register. The latter temporarily stores the instruction word and, upon command, transfers the same to an instruction decoder. The function of the instruction decoder is to produce control pulses which actuate a machine instruction generator sometimes also known as an "operations signal generator."

The purpose of the machine instruction generator is to produce the control signals necessary for the various operations required by the instruction. These control signals which are termed here "machine instruction signals" (and are also sometimes known as "commands") become the inputs to the various computer stages which are to perform the desired computer operations. One "machine instruction" (MI) corresponds to a group of machine instruction signals. One instruction word may correspond to as many as several hundred machine instructions.

In prior art synchronous computers, the machine instruction signals are pulses and they occur in time sequence. The term "synchronous" refers to the definiite, predetermined spacing between pulses. The spacing is controlled by a highly accurate "clock," such as a crystal controlled oscillator. The pulses may be of the same duration by may be added together as, for example, by means of an "or" gate to provide longer pulses which are integral multiples of the duration of one machine instruction pulse.

The machine instruction signals must pass through output gates in the machine instruction generator. In modern computers, the gates may consist of transistors. After passing through the gates, the signals may be transmitted along various transmission lines to the stages which are to perform the operations directed.

There may be large numbers (several thousand) of gates such as discussed above in a machine instruction generator. The transistors in these gates, even though of high quality, vary relatively widely in the delays they introduce. As a practical illustration, it is found in one particular computer to be discussed in more detail later, that the best gate, that is, the fastest one, has a delay of 2 nanoseconds whereas the worst gate has a delay of 40 nanoseconds.

The signals amplified by the gates are applied to transmission lines. These have a certain amount of distributed capacitance per unit of length. A fast gate can charge this distributed line capacitance much more rapidly than a slow gate can. In the computer under consideration, a transmission line driven by a fast gate introduces a delay (due both to the charging time and the normal delay per unit of length) of 4 nanoseconds per foot of line length, whereas a transmission line driven by a slow gate introduces a delay of 10 nanoseconds per foot of line length.

The above delays introduces serious problems. Consider a transmission line between a machine instruction generator and some stages to which a machine instruction is transmitted, which in one case is only two feet long and in another case is a hundred feet long. The fastest gate transmits a machine instruction pulse down the shortest line in 10 nanoseconds. The slowest gate transmits a machine instruction pulse down the longest line in 1040 nanoseconds. If the pulse delayed only 10 nanoseconds is intended for a stage which is not meant to begin its operation before the stage which receives the pulse delayed 1040 nanoseconds has completed its operation, it is necessary that the time spacing between these two pulses include the difference in the two quantities above, namely 1030 nanoseconds. Moreover, since the machine is synchronous, this means that the spacing between all other machine instruction pulses must include this "worst case" delay, namely 1030 nanoseconds. This spacing has to be provided even though the average transmission delay (one which results when a transmission line of average length is driven by a gate of average speed) is only a fraction such as $1/10$ or less of 1030 nanoseconds.

As mentioned above, a machine instruction may include a larger number of machine instruction signals. If the average machine instruction contains 10 pulses, the total delay between pulses required for transmission under the conditions above is $10 \times 1030$ nanoseconds=10.3 microseconds. (There is also a delay required to perform the machine operation. This delay is to be discussed later.) If, as mentioned above, the average transmission delay is only $1/10$ the worst case delay, the 10.3 microseconds corresponds to a time loss of over 9 microseconds. Such delays severely slow down the speed at which the computer is capable of operating.

Even in the case in which all the machine instruction pulses in a given machine instruction are to be transmitted over roughly the same length of transmission wire, there is still considerable difference between the longest transmission time and the shortest transmission time. In the case, for example, of a 2 nanosecond gate driving a hundred feet of transmission wire, the delay is 402 nanoseconds. As already mentioned, the transmission delay for a 40 nanosecond gate driving a hundred feet of wire is 1040 nanoseconds. The difference between these two quantities is 638 nanoseconds.

If the transmission line lengths are longer than those discussed above, the worst case condition is such that even more time is lost in transmitting machine instructions to the stages desired. Moreover, in practical synchronous computers, additional fixed delay are introduced between machine instruction pulses to compensate for "pulse shrinkage" and "pulse stretching" if high speed computer performance is required.

A machine instruction pulse must have a duration sufficient to permit the stage to which it is applied to perform its function. However, the actual time required to perform the function is not necessarily fixed. In the case of a particular 48 bit adder, for example, the addition time is 3 microseconds in the worst case, that is, when there are a maximum number of carrys, 0.1 microsecond in the best case, and 0.5 microsecond on the average. In the case of a synchronous computer, the machine instruction pulse applied to the adder must have a duration of at least 3 microseconds—sufficient to allow for the worst case, that is, the longest addition time. This means that the next machine instruction pulse must be delayed this amount, in addition to the transmission delays already mentioned. This further slows down the computer.

In the more expensive "sophisticated" synchronous machines presently available, the machine instruction execution time is made different for different machine instructions in order to compensate to some extent for the system inadequacies discussed above. However, this requires either one complicated clock system or several different synchronous clocks. The control logic circuits in both cases are complicated and expensive. And, even more important, the flexibility of these types of machines is highly limited. Any change in the machine or expansion of the machine requires major modifications. For example, the clock system may have to be reconstructed. Moreover, the individual operations, such as addition, still require the "worst case" delay.

Brief description of invention

The machine instruction signals of the system of the present invention are direct current levels. All of the signals (levels) making up a given instruction are initiated simultaneously. The first of the signals of an individual instruction arrives at its stage, which may be a synchronous stage. In this case, the first signal is also simultaneously applied to a delay means located at this first stage and having a delay equal to the maximum delay which may be introduced by the first stage. The second machine instruction signal is applied to a gate at the input to a second stage. After the first stage has completed its operation, its output word is available for the second stage. At the same time, the delayed first machine instruction signal arrives at the same gate to which the second machine instruction signal is applied. When both the delayed first machine instruction signal and the second machine instruction signal are present at the gate, the gate applies an enabling signal to the second stage. Accordingly, the time at which the second stage can begin its operation depends only on the longer one of (a) the transmission time of the second machine instruction signal to the gate or (b) the transmission time of the first machine instruction signal to the first stage plus the delay introduced by the delay means.

In the event that both transmission times are rapid, as would occur if both wires were driven by a fast gate, the operations performed by the first and second stages occur more rapidly. If the gates are slow gates, the time required for the machine instruction signals to reach the gates is longer so that the time required to complete the operation is longer. On the average, however, the system delays are average system delays rather than worst time system delays as in the prior art. Moreover, if the second machine instruction signal arrives before the first stage has completed its operation, no harm is done. The second stage cannot start until both the second machine instruction pulse and the delayed first machine instruction pulse are present.

In the example above, the first stage was stated to be synchronous. This is not necessarily the case. The first stage or any one of the other stages may be made asynchronous and in this manner further speed advantage gained. For example, in the case that the first stage is asynchronous, it has included in the stage a circuit which senses when the operation is completed and at that time produces an output direct current level. This output level serves as one of the inputs to the gate for the following stage. The second input to that gate is the second machine instruction signal. When both the second machine instruction signal and the signal generated by the asynchronous stage are present, the gate applies a control signal to the second stage and causes the second stage to begin its operation.

The system of the present invention has a number of important advantages. One has already been discussed, namely a substantial increase in computer speed. The transmission time of a machine instruction is now the average transmission time of one machine instruction signal rather than the sum of the worst case transmission time of each signal. Further, the data processing system can easily be expanded. In the prior art synchronous computers, expansion was often not possible without reconstruction of the central clock system. Further, now individual logic stages can be substituted for one another without major change in the central control system of the computer.

Brief description of drawings

Corresponding elements and waveforms in various of the figures are legended with the same reference characters.

General

A number of blocks shown in the figures above are in themselves known circuits. The circuits of the blocks are actuated by electrical signals applied to the blocks. When a signal is at one level, it represents the binary digit "one" and when it is at another level, it represents the binary digit "zero." For the sake of the discussion which follows, it may be assumed that a high level signal represents the binary digit "one" and a low level signal (which may be zero volts), the binary digit "zero." Also, to simplify the discussion, rather than speaking of an electrical signal being applied to a block or logic stage, it is sometimes stated that a "one" or a "zero" is applied to a block or stage.

Throughout the figures capital letters and small letters are used to represent the signals indicative of binary digits. For example, $X_0$ may represent the binary digit "one" or the binary digit "zero." $\overline{X}_0$ represents the complement of $X_0$. In some cases, letters (and binary digits "one" and "zero") are employed in Boolean equations as a convenient means for succinctly describing the circuit operation.

A number of elementary logic circuits are present in various ones of the figures. An "and" gate produces a "one" output when and only when all of the inputs to the gate are "one" and a "zero" output when one or more of the inputs are "zero." An "or" gate produces a "one" output when one or more of the inputs are "one." A "none" gate, sometimes also known as a "nor" gate, produces a "one" output when all of the inputs to the gate are "zero" and a "zero" output when one or more of the inputs are "one." This gate may consist of an "and" gate which has an inverter in series with each of its input leads. Alternatively, a "none" may consist of an "or" gate followed by an inverter. Regardless of the way in which the "none" gate is implemented, its Boolean equation in the case in which there are two inputs A and B and one output C is $\overline{AB}=C$ or $\overline{A+B}=C$.

Description of system

Figure 1:
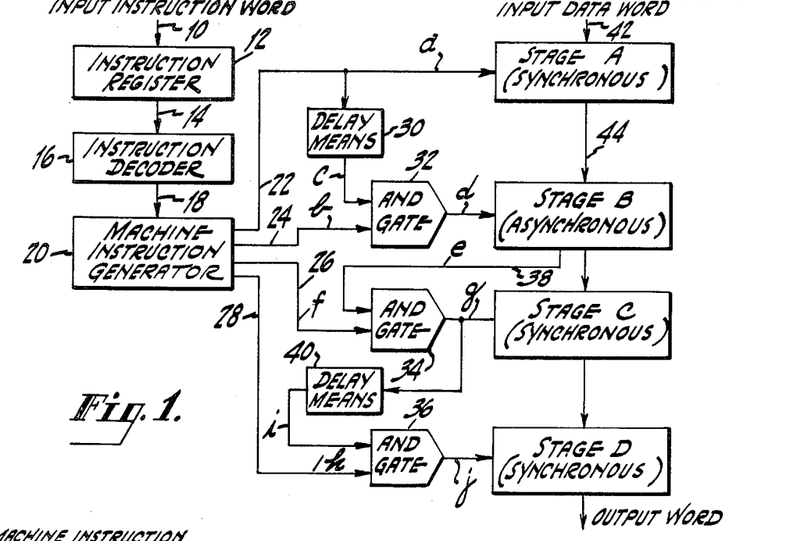
FIG. 1 is a block circuit diagram of a portion which includes the invention of a large scale digital computer.

In the system shown in part in FIG. 1, buses are illustrated as single leads. For example, the lead 10 to the instruction register 12 in the computer under discussion may include 28 wires, one for each bit of a 28 bit word. Also, some stages and some input and output leads are not shown. These are illustrated and discussed later.

In the system shown in FIG. 1, the input instruction word is applied from some place in the computer such as the memory via a data transmission bus to the instruction register 12. The word stored in the register may subsequently be applied through gates in the register and the bus 14 to the instruction decoder 16. The output of the instruction decoder which consists of groups of pulses in various patterns is applied via bus 18 to the machine instruction generator 20.

The instruction register, instruction decoder, and machine instruction generator are known units. They are discussed, for example, in "Digital Computer and Control Engineering," by Ledley, McGraw-Hill, 1960, chapter 17. In this volume the machine instruction generator is termed an "operations signal generator" and should not be confused with the instruction register and decoder or the like. The function of the generator is to produce a group of control signals which become inputs to the circuits which are to perform desired computer operations such as addition as one example. A simplified version of a specific machine instruction generator useful in the present invention is given later.

It is assumed for the purposes of the present discussion that in response to a particular signal applied to the machine instruction generator via bus 18, the generator produces a machine instruction $MI_x$. $MI_x$ consists of four pulses, $a, b, f, h$, one for each of the stages that is to perform a certain function. The four stages are shown in the figure as stages A, B, C, and D. Stage B is an asynchronous stage and stages A, C, and D are synchronous stages. These choices are purely arbitrary and are given merely by way of example.

The four machine instruction pulses are applied via transmission lines 22, 24, 26, and 28. The first machine instruction pulse $a$ is applied directly over line 22 to stage A. Details of this stage are given later in connection with FIG. 5. This first pulse is also applied through delay means 30 to one of the inputs to gate 32.

It may be assumed for the present that gate 32 and the others to be discussed are "and" gates and that each requires two voltages indicative of the binary digit "one" as inputs to produce a voltage indicative of the binary digit "one" at its output. It is to be understood, however, that gate 32 can be some other type of gate such as a "nor" gate in which case two "zeros" applied to the input would be required to produce a "one" at the output.

The second machine instruction signal $b$ is applied over line 24 to the second input to gate 32. The third machine instruction signal $f$ is applied as one input to "and" gate 34; the fourth machine instruction pulse $h$ is applied as one input to "and" gate 36.

Stage B is asynchronous. In other words, the time required for it to perform its logic function is variable. As one example, stage B may be an asynchronous adder. There is a circuit in stage B (shown later in FIGS. 6 and 8) which senses when the stage has completed its logic function and in response to the completion of the function generates an output signal $e$ on lead 38. This signal is applied as the second input to "and" gate 34. The output of "and" gate 34 is applied through a delay means 40 as the second input to "and" gate 36.

Figure 2:
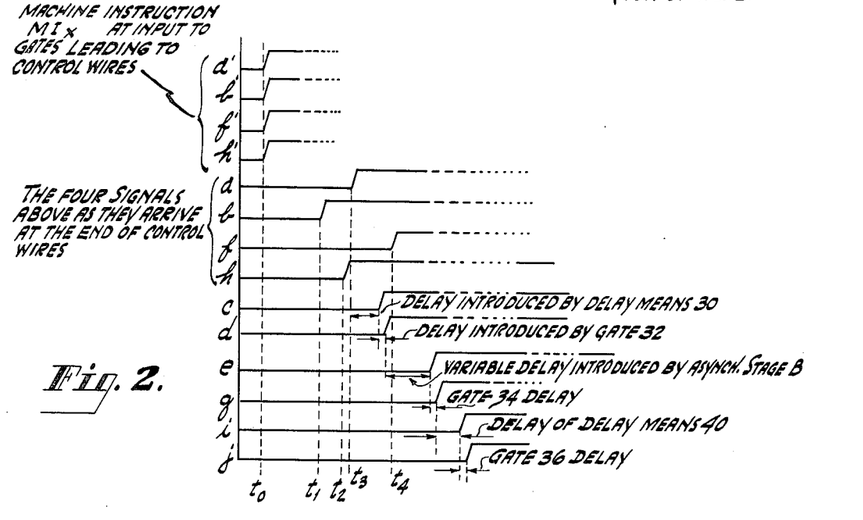
FIG. 2 is a drawing of waveforms present at various points in the circuit of FIG. 1.

The operation of the circuit of FIG. 1 may be better understood by referring to FIG. 2. The machine instruction generator includes output gates (shown in FIG. 3), one connected to each of the lines 22, 24, 26, and 28, respectively. According to the present invention, rather than generating the machine instruction pulses in time sequence the gates just mentioned have input signals applied simultaneously. The four input signals at the inputs to these gates are shown at $a'$, $b'$, $f'$, and $h'$ in FIG. 2.

As mentioned in the introduction, the gates discussed above are made up of transistors and these transistors are found to have different inherent delays. In the practical computer under discussion, the delay introduced by the fastest transistor is 2 nanoseconds and the delay introduced by the slowest transistor is 40 nanoseconds. Also, as previously discussed, the wire connected to the slowest gate introduces a delay of 10 nanoseconds a foot whereas the wire connected to the fastest gate introduces a delay of only 4 nanoseconds per foot. In view of these various delays, the machine instruction pulses arrive at the stages to which they are transmitted in different time intervals. FIG. 2 shows that the signals $a$, $b$, $f$, and $h$ arrive at times $t_3$, $t_1$, $t_4$, and $t_2$, respectively.

When the machine instruction pulse $a$ arrives at stage A, this stage immediately begins the function it is to perform. The input data word is already available at stage A having been applied via bus 42. Since stage A is a synchronous stage, the time required to perform its function is the same regardless of the characteristics of the data word. Accordingly, after a predetermined known delay, the output of stage A is available at bus 44.

The delay means 30 is adjusted to have a delay which is equal to the time required by stage A to perform its function. Accordingly, at the time the output word of stage A is available at bus 44, a delayed signal $c$ appears at the output of the delay means 30 and is applied as one of the inputs to gate 32. If, as would normally be expected, the signal $b$ is already at the second input to the gate 32, the gate 32 is enabled and an output $d$ appears at the gate output. The signal $d$ starts the operation of stage B.

In some circumstances it may be that line 24 which carries the second machine instruction signal $b$ is connected to a very slow gate in the machine instruction generator. In this case, signal $c$ arrives at the gate 32 prior to the time signal $b$ arrives. However, this does not affect the operativeness of the system. It merely slows down the system slightly. On the average, gate 32 will be enabled after a time equal to the average time required for a machine instruction signal to travel from the machine instruction generator to gate 32 or to stage A plus the fixed delay introduced by delay means 30. This fixed delay, it will be recalled, is the time required by stage A to perform its function.

To digress for a moment, it was stated that stage A is synchronous. This means that the time required by stage A to perform its function is fixed. As a practical matter, stage A may require somewhat longer time to perform its function in some cases than in others. If the difference between the worst case time (the slowest time) and the best case time (the fastest time) is relatively small, the stage is considered synchronous and the delay of delay means 30 is made equal to the longest delay (the worst case delay) introduced by stage A. The reason this is done is that there is some expense involved in making a stage asynchronous rather than synchronous, namely, that required for the sensing circuit which indicates when the operation is completed. In brief, if the time to be saved is out of proportion to the expense involved, the choice made is to save the expense.

FIG. 2 illustrates the various signals discussed above and the times involved. The delay introduced by delay means 30 is shown at waveform $c$. The small additional delay introduced by gate 32, which is shown at d, is the inherent delay of the circuit elements making up gate 32. In practice, this delay is very small as the transistors employed for gates such as 32, 30 are expensive, high speed elements. The same holds for gates 34 and 36.

When signal d arrives at stage B, the data word input to the stage (carried by bus 44) is already available at stage B. Stage B, therefore, starts the operation it is to perform. The length of time required to perform this operation varies. However, as soon as the operation is completed, a return signal e appears at lead 38 and it is applied as one of the inputs to gate 34. If the third machine instruction signal f is already available at gate 34, the gate is enabled and a control signal g appears at the gate output. On the other hand, if pulse e arrives first, the gate 34 is not enabled until pulse f arrives from the machine instruction generator. The various signals and the delays between them are shown in FIG. 2.

As in the case of stage A, the time at which stage B completes the logic function it performs is an average case time rather than a worst case time. In other words, stage B starts its logic operation, on the average, after a time equal to the average transmission time of machine instruction pulse from the machine instruction generator to stage A plus the fixed time required by stage A to perform its logic function. The stage B completes its logic function in an average time due to its asynchronous nature. This contrasts with the prior art in which the delay between a machine instruction pulse applied to stage B and a machine instruction pulse applied to stage C must include the worst case time for stage B to perform its operation. This prior art delay time, of course, must also include a delay equal to the difference between the slowest transmission time of one machine instruction pulse and the fastest transmission time of another instruction pulse, as already discussed.

The operation of stages C and D is similar to that of the operation of stage A. The various waveforms a, b, c and so on illustrated in FIG. 2 correspond to the waves carried by the lines in FIG. 1 bearing the same reference letters. Note that the delay means 40 introduces a delay equal to that introduced by stage C. The delay introduced by stages A and C, of course, can be different. For example, stage C may include only one level of logic and stage A may include three or four levels of logic. Thus, the delay introduced by stage A (and also by its delay means 30) may be several times that introduced by stage C (and its delay means 40).

The system just described is very flexible. For example, if it is desired to make the computer more powerful by substituting a faster logic stage for stage A, this can easily be done by substituting one for the other and changing the value of the delay introduced by delay means 30 correspondingly. The same thing can be done for any of the stages. Moreover, synchronous stages may be substituted for asynchronous stage and vice versa, if desired. In the case of a synchronous stage, a delay means is required. In the case of an asynchronous stage, a delay means is not needed but the return from the asynchronous stage is instead applied as the input to the gate to the succeeding stage.

Another advantage of the system is that the data transmission bus length need not be fixed. For example, suppose the maximum data transmission bus length is a hundred feet and it is desired to add several more computer racks with peripheral equipments. These can be added by adding more length to the transmission bus. The central control area of the computer need not be changed. Because there is no clock pulse generator, such a generator need not be changed. The additional equipment may be further from the machine instruction generator but this only means that the time required for the machine instruction signals to reach the further equipment is somewhat longer.

*Instruction register, instruction decoder, and machine instruction generator*

Figure 3:
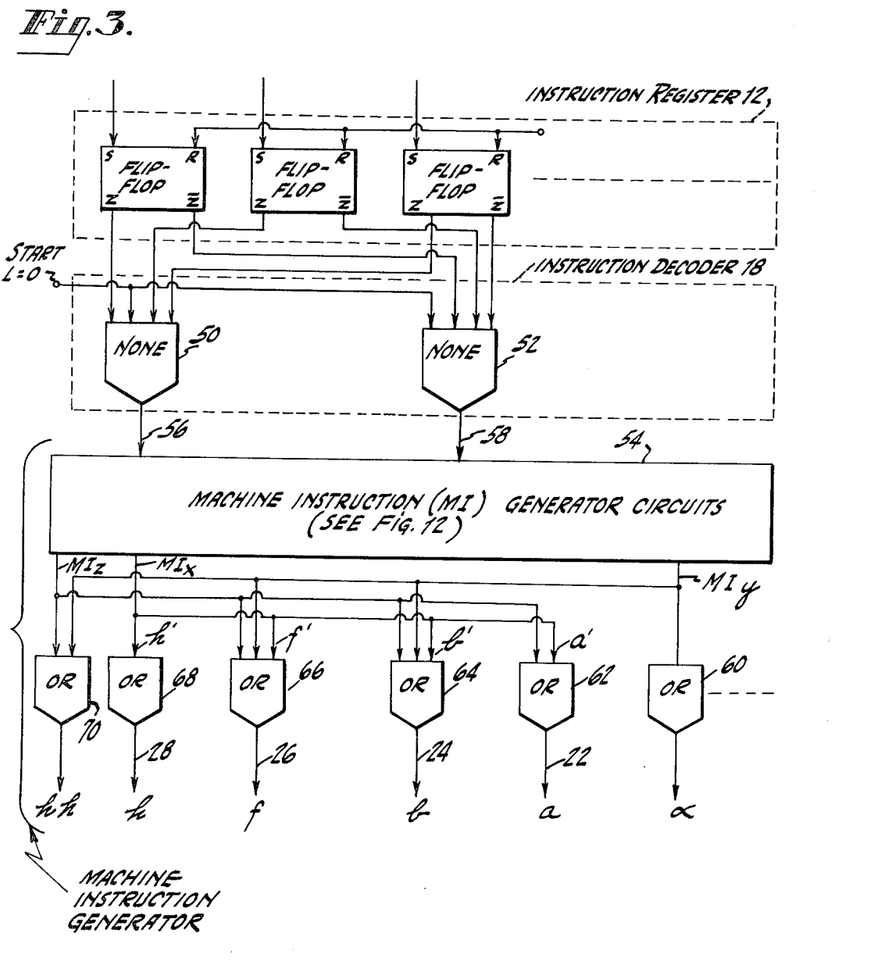
FIG. 3 is a more detailed block diagram of the instruction register, instruction decoder, and machine instruction generator shown in FIG. 1.

A more detailed showing of the instruction register, instruction decoder and machine instruction generator appears in FIG. 3. The instruction register consists of a large number of flip-flops. Three of these are shown. They are actuated by pulses or D.C. levels applied to the set terminals. These pulses or levels represent the binary bits of an instruction word.

Each flip-flop both here and elsewhere in this application has a set input terminal S and a reset input terminal R. Each also has a Z output terminal and a $\bar{Z}$ output terminal. The convention is adopted that when a flip-flop is set (a binary "one" applied to the S terminal), its $\bar{Z}$ output equals "one" and its Z output equals "zero." The reverse occurs when the flip-flop is reset as by applying a "one" input to its reset (R) terminal. It is also to be understood that the flip-flops in the instruction register and in other registers discussed later may be periodically or intermittently reset by an appropriate pulse or D.C. level applied to the reset terminal.

The instruction decoder consists of a large number of gates. For the purposes of the present discussion it is assumed that "none" gates are employed. Two such gates 50 and 52 are shown. Each of the gates includes an L input. L is normally "one" but is made "zero" when it is desired to "prime" the gates, that is, place them in condition to produce a "one" output if all other inputs are also "zero." Various outputs of the flip-flop are connected to the various gates according to some predetermined coding. In the example chosen for illustration, the Z outputs of the three flip-flops illustrated are connected to "none" gate 50 and the $\bar{Z}$ outputs of the three flip-flops are connected to the "none" gate 52. Accordingly, it is clear that when the input bits to the three flip-flops are 111, "none" gate 50 is actuated and when the three inputs to the flip-flop are 000, "none" gate 52 is actuated. In both cases, it is assumed that $L=0$.

Figure 12:
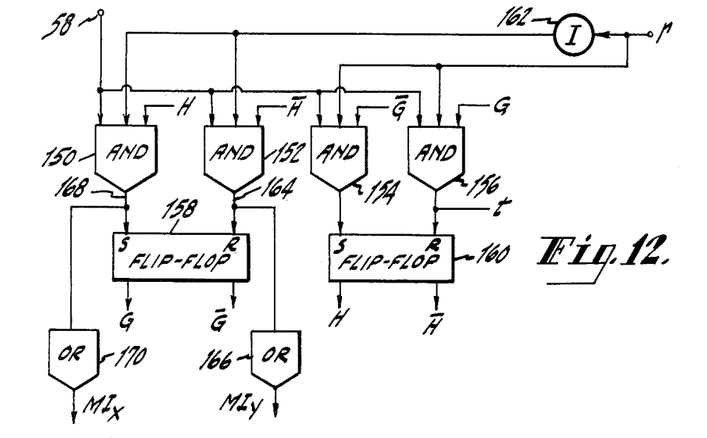
FIG. 12 is a block circuit diagram showing details of the machine instruction generator circuits of FIG. 3.

The circuits which produce the machine instructions (MI's) are illustrated by a single block 54 in FIG. 3 and are shown in more detail in FIG. 12. FIG. 12 is discussed later. The purpose of the generator circuits 54 is to generate a sequence of machine instructions for the code stored in the instruction register as decoded by the instruction decoder 18. An example is given later. In this example, the word stored in the three flip-flop stages shown of the instruction register is 000. In response to this word, lead 58 carries a binary "one" and the machine instruction generator circuits generate two machine instructions, namely $MI_x$ followed by $MI_y$. As is discussed in the paragraphs which follow, an instruction $MI_x$ corresponds to a group of machine instruction signals a, b, f, h and the instruction $MI_y$ corresponds to a group of machine instruction signals a, b, f, (hh).

The machine instructions (MI's) are applied to various logic stages. For the purposes of the present discussion, six such stages 60, 62, 64, 66, 68 and 70 are illustrated. All are "or" gates. It can be seen that when circuits 54 produce $MI_x$, the "or" gates produce outputs a, b, f, h. When circuits 54 produce $MI_y$, the "or" gates produce α, b, f, hh. When the circuits produce $MI_z$, the "or" gates produce a, b, f, hh.

Figure 4:
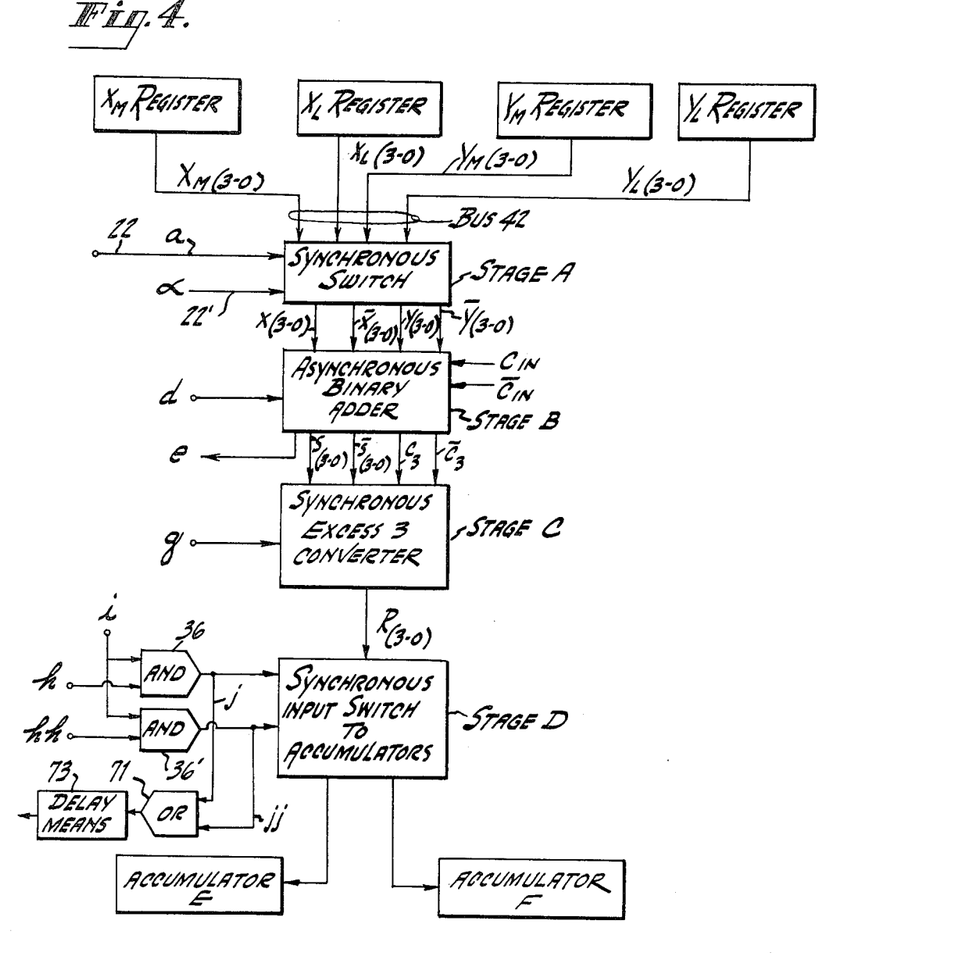
FIG. 4 is a more detailed showing of a part of the system of FIG. 1. In this drawing the various stages A–D are assigned specific functions.

In addition to the binary bits applied by the instruction decoder 18, the generator circuits 54 receive a return signal r from one of the logic stages of FIG. 4. The purpose of this return signal is to activate certain gates in the circuits 54 and to inactive others. This return signal is discussed later in connection with FIGS. 12 and 4.

*More detailed showing of logic stages*

In the general discussion appearing at the first part of this application, the various logic stages legended A–D are described in broad terms. FIG. 4 illustrates more specifically possible configurations for these stages. It also illustrates possible inputs to the group of stages and possible outputs from the stages. It is to be understood, of course, that these specific circuits are given merely by way of example and are not meant to be limiting.

Stage A is shown as a synchronous switch. This stage receives a machine instruction $a$ or a machine instruction $\alpha$. The machine instruction $a=1$ commands the synchronous switch to apply a four bit word stored in the $X_M$ register and a four bit word stored in the $Y_M$ register to the asynchronous binary adder (stage B). Each four bit word is assumed to represent an excess 3 coded decimal number. The machine instruction $\alpha=1$ causes the synchronous switch to apply the four bit word stored in the $X_L$ register and the four bit word stored in the $Y_L$ register to the asynchronous binary adder. Stage B adds together the two four bit words applied to it by the synchronous switch when it receives signal $d$ (FIG. 1). Signal $d$ may be generated in response to delayed signal $a$ (signal $c$) and signal $b$ applied to "and" gate 32 (FIG. 1). Alternatively, in the event that the first machine instruction signal is $\alpha$, then $\alpha$ is delayed and serves as one of the inputs to "and" gate 32. The binary adder also receives (from a lower order stage) a carry input quantity $C_{in}$ and the complement of this quantity $\overline{C}_{in}$. The adder includes a stage which senses when the addition is completed and, at that time, produces an output signal $e=1$.

The words stored in the X and Y register shown are coded in excess 3 code. Accordingly, the result of the addition performed by the asynchronous binary adder is either in excess 6 or excess 0 code. Stage C is a synchronous excess 3 converter. It receives from the asynchronous binary adder a four bit S word, the complement of this word, the carry $C_3$, and its complement $\overline{C}_3$. As is explained in more detail later, the value of the carry and its complement determines whether the converter converts an excess 0 word to an excess 3 word or an excess 6 word to an excess 3 word.

The stage following the excess 3 converter is a synchronous switch stage. It determines whether the four bit ($R_3$–$R_0$) output word of the excess 3 converter is to be applied to accumulator E or to accumulator F. When the machine instruction bit is $h=1$, the switch applies the R word to accumulator E and when the machine instruction bit is $hh=1$, the synchronous switch applies the R word to accumulator F.

The two blocks 71, 73 at the lower left of FIG. 4 are the circuits for generating the return signal $r$ discussed briefly in connection with FIG. 3 and to be discussed in more detail later in connection with FIG. 12. The circuit includes an "or" gate 71 receiving inputs $j$ and $jj$ and a delay means 73. The signal $j$ or $jj$ initiates the operation of the synchronous input switch to the accumulators. This signal is applied through "or" gate 71 to delay means 73. The delay means inserts a delay at least equal to that of the synchronous input switch—stage D. Accordingly, the signal $r$ occurs when stage D has completed its operation. The signal $r$ may be employed to terminate one machine instruction and to start the next machine instruction. In the detailed discussion later in FIG. 12, this operation is illustrated by having $r$ terminate $MI_x$ and start $MI_y$ and later having $r$ terminate $MI_y$.

*Input registers and synchronous switch (stage A)*

In the following discussion it is assumed that the various X and Y registers shown in FIG. 4 are each already storing a word. Only the $X_M$ register and the $X_L$ register and the portion of the synchronous switch associated with these two registers are shown. The $Y_M$ and $Y_L$ registers are identical to the X registers shown and the gates making up the synchronous switch for these registers are also identical to the "none" gates shown.

Figure 5:
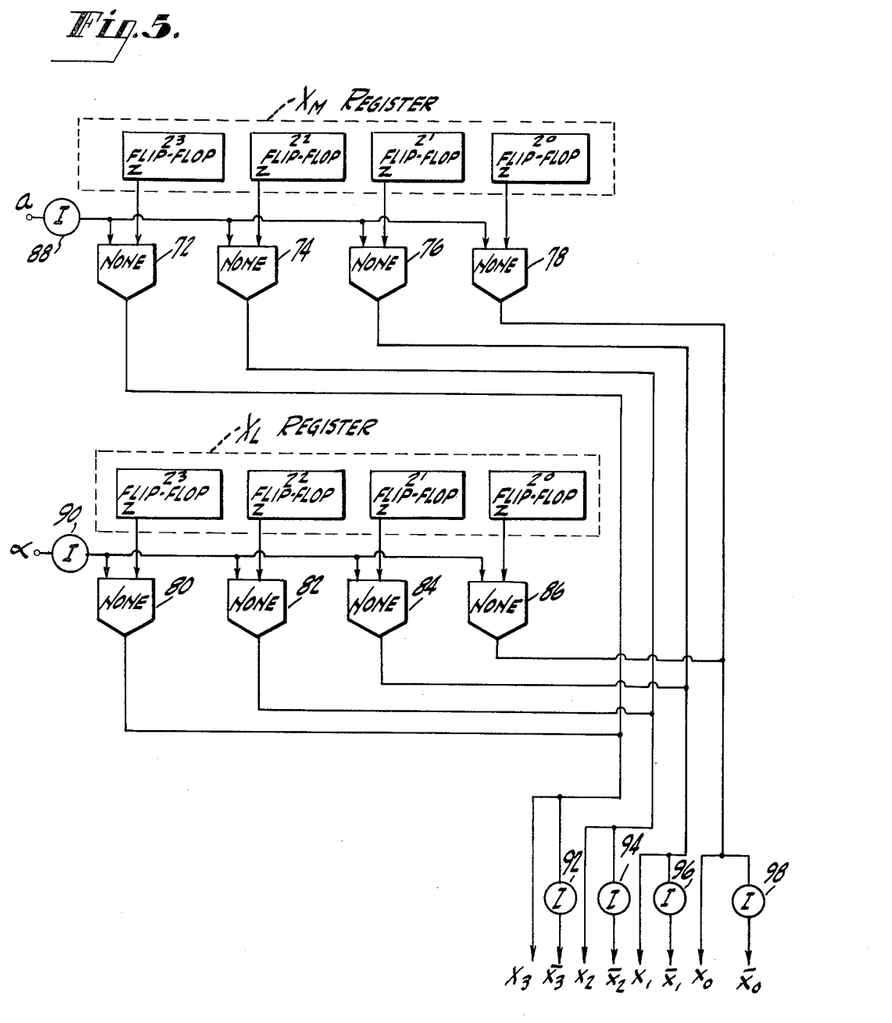
FIG. 5 is a more detailed showing of the input registers and the synchronous switch of FIG. 4.

The $X_M$ register is illustrated in FIG. 5 as four flip-flops, each storing a binary bit of different rank. The flip-flops are legended $2^0$, $2^1$, $2^2$ and $2^3$ flip-flops. The $X_L$ register is similar to the $X_M$ register and the various flip-flops are also similarly legended.

The synchronous switch includes a "none" gate for each flip-flop in each register. Thus, for the $X_M$ register, the synchronous switch includes four "none" gates 72, 74, 76 and 78 and for the $X_L$ register, the switch includes four "none" gates 80, 82, 84 and 86. Each "none" gate is connected to the Z output of a different flip-flop.

In operation, $a$ and $\alpha$ are both normally "zero." These binary digits are applied to the "none" gates through inverters 88 and 90, respectively. Thus, each of the "none" gates normally has a "one" input so that each normally produces a "zero" output. When it is desired to apply the contents of the $X_M$ register to the asynchronous binary adder, $a$ is made "one" and $\alpha$ is maintained "zero." When $a$ is changed to "one," each of the gates 72, 74, 76 and 78 has an $a=0$ input. Each also has an input from a flip-flop. When the two inputs to a "none" gate are both "zero," a "one" appears at the output of that "none" gate.

The various "none" gates are connected both directly and through inverters to the binary adder. For a four bit word there are four such inverters, illustrated at 92, 94, 96 and 98, for each word to be added. Thus, in the case in which $a$ is "one," the four bit word in the $X_M$ register and the complement of this word are applied to the binary adder. In a similar manner, the four bit word stored in the $Y_M$ register and the complement of this word (there are four inverters associated with the two Y registers) are also applied to the binary adder. On the other hand, when $\alpha$ is made "one" and $a$ is maintained "zero," the four bit binary words stored in the $X_L$ register and the $Y_L$ register are applied to the binary adder.

*Asynchronous binary adder*

Figure 6:
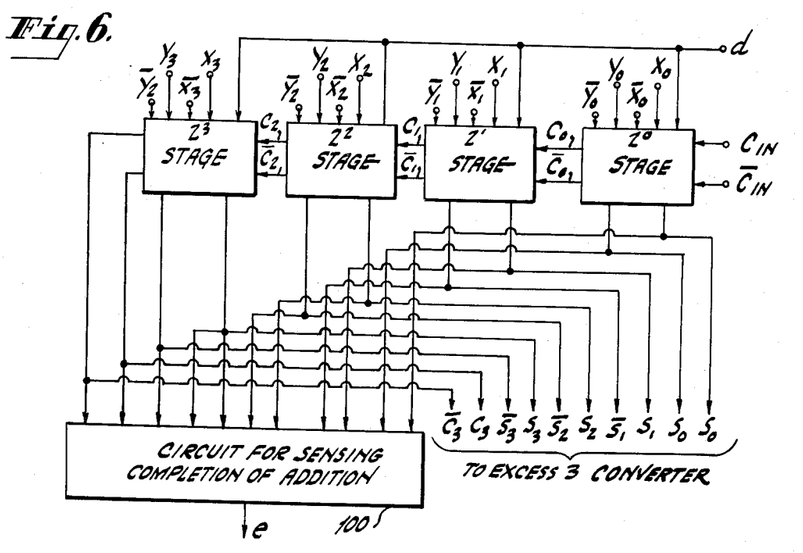
FIG. 6 is a block circuit diagram of the asynchronous adder of FIG. 4.

A block circuit diagram of a portion of an asynchronous binary coded decimal adder appears in FIG. 6. It may be assumed that the circuit shown is for adding the decimal digits (each represented by four bits) of highest order. As there are four X bits to be added to four Y bits, the adder consists of four stages. These are legended the $2^0$, $2^1$, $2^2$ and $2^3$ stage, corresponding to the ranks of the bits being added. The $2^0$ stage, in addition to receiving the X and Y bits, also may receive a carry input bit $C_{In}$ and its complement $\overline{C}_{in}$ from a lower decimal order stage. Each of the adder stages produces an S output and a $\overline{S}$ output. Each also produces a C output and a $\overline{C}$ output. The S outputs of all stages and the C outputs of the last stage, that is, the one representing the binary digit of most significance, are applied to a circuit for sensing the completion of addition. This stage is shown as block 100. When the addition is complete, the last-named circuit produces an output $e=1$.

The various stages of the adder shown in FIG. 6 are substantially identical except for inputs. Accordingly, only one of these, namely the $2^0$ stage, is shown in detail in FIG. 7. This stage consists of eight "and" gates 102–109 for obtaining the sum output quantities $S_0$ and $\overline{S}_0$ and six "and" gates, namely 110–115 for obtaining the carry output quantities $C_0$ and $\overline{C}_0$.

Figure 7:
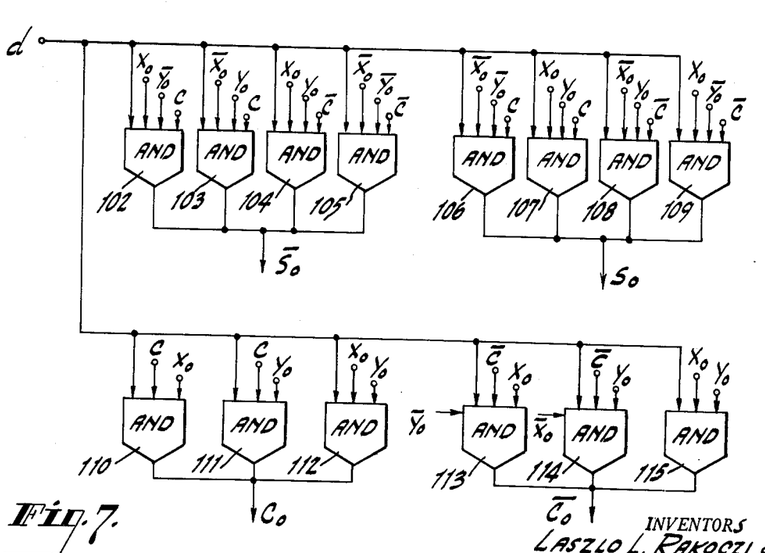
FIG. 7 is a more detailed block diagram of the $2^0$ stage of the adder of FIG. 6.

The circuit operation of the asynchronous binary adder to FIG. 7 is succinctly described in the following general Boolean equations.

$$S_n = C_{n-1}(\overline{X}_n\overline{Y}_n + X_nY_n) + \overline{C}_{n-1}(X_n\overline{Y}_n + \overline{X}_nY_n) \quad (1)$$
$$\overline{S}_n = C_{n-1}(X_n\overline{Y}_n + \overline{X}_nY_n) + \overline{C}_{n-1}(X_nY_n + \overline{X}_n\overline{Y}_n) \quad (2)$$
$$C_n = C_{n-1}(X_n + Y_n) + X_nY_n \quad (3)$$
$$\overline{C}_n = \overline{X}_n\overline{Y}_n + \overline{C}_{n-1}(X_n\overline{Y}_n + Y_n\overline{X}_n) \quad (4)$$

where $n$ represents the rank of the input and output binary bits.

In the equations above it is assumed that $d$, the machine instruction bit, is "one." This implies that stage A, that is, the synchronous switch, has applied the two words to be added to the asynchronous binary adder. Prior to that time $d=0$ and when $d=0$, $S_0=\bar{S}_0=0$ and $C_0=\bar{C}_0=0$.

Figure 8:
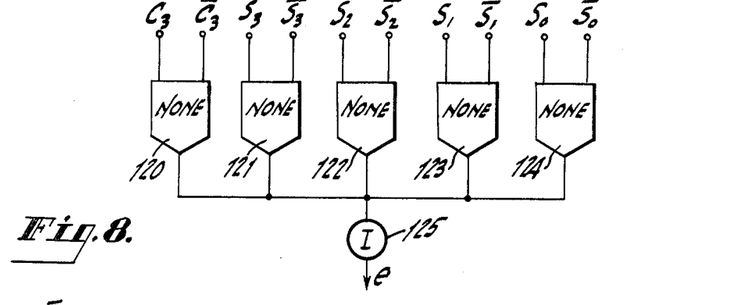
FIG. 8 is a block circuit diagram of the circuit in the asynchronous adder for sensing when the addition is completed.

The circuit for sensing the completion of the addition is shown in FIG. 8. It comprises five "none" gates 120–124, respectively. The first "none" gate 120 receives inputs $C_3$ and $\bar{C}_3$ and the remaining "none" gates receive the S and $\bar{S}$ inputs indicated. The "none" gate outputs are all applied to an inverter 125.

In operation, if it appears that any S equals its complement, $\bar{S}$ equals "zero" or that $C_3=\bar{C}_3=0$, the addition is not completed. In the first case the S digit has not yet been generated and in the second case the last carry has not yet propagated through the four stages making up the adder. If it appears that $S=\bar{S}=0$ or that $C_3=\bar{C}_3=0$, the "none" gate to which the S quantities or the C quantities are applied produces a "one" output. In this case, $e$, the output of the circuit, is "zero" and this indicates that the addition is not yet completed. On the other hand, when each "none" gate receives a binary bit "one" and its complement "zero," then each "none" gate produces a "zero" output. Under these circumstances, the inverter 125 produces an $e=1$ output indicating that the addition is completed. As previously discussed, this $e=1$ output permits the stage following the binary adder, namely the synchronous excess 3 converter to start performing its logic function.

*Excess 3 converter*

As already mentioned, the asynchronous binary adder adds two excess 3 coded decimal numbers. As understood in this art, the sum output which is produced is either an excess 6 or an excess 0 coded decimal number with a carry. If the carry $C_3$ is a "one," this means that the result of the addition is in excess 0 code. If the carry $C_3$ of the addition is a "zero," the sum produced by the adder is in excess 6 code. See in this connection any standard reference such as Ledley, "Digital Computer and Control Engineering," page 507. The purpose of the excess 3 converter is to change the number produced by the asynchronous adder to an excess 3 decimal coded number.

The table below shows the conversion required to change an excess 0 or an excess 6 coded decimal number to an excess 3 coded decimal number.

| $\bar{C}_3=1$ | | $C_3=1$ | |
|---|---|---|---|
| Excess 0, S output of adder | Corresponding excess 3 coded | Excess 6, S output of adder | Corresponding excess 3 coded |
| $2^3\ 2^2\ 2^1\ 2^0$ | $2^3\ 2^2\ 2^1\ 2^0$ | $2^3\ 2^2\ 2^1\ 2^0$ | $2^3\ 2^2\ 2^1\ 2^0$ |
| 0 0 0 0 | 0 0 1 1 | 0 1 1 0 | 0 0 1 1 |
| 0 0 0 1 | 0 1 0 0 | 0 1 1 1 | 0 1 0 0 |
| 0 0 1 0 | 0 1 0 1 | 1 0 0 0 | 0 1 0 1 |
| 0 0 1 1 | 0 1 1 0 | 1 0 0 1 | 0 1 1 0 |
| 0 1 0 0 | 0 1 1 1 | 1 0 1 0 | 0 1 1 1 |
| 0 1 0 1 | 1 0 0 0 | 1 0 1 1 | 1 0 0 0 |
| 0 1 1 0 | 1 0 0 1 | 1 1 0 0 | 1 0 0 1 |
| 0 1 1 1 | 1 0 1 0 | 1 1 0 1 | 1 0 1 0 |
| 1 0 0 0 | 1 0 1 1 | 1 1 1 0 | 1 0 1 1 |
| 1 0 0 1 | 1 1 0 0 | 1 1 1 1 | 1 1 0 0 |

From the table above, the following Boolean equations may be derived.

$$R_0=\bar{S}_0 \tag{5}$$
$$R_1=\bar{S}_3\bar{S}_2\bar{S}_1\bar{S}_0 C_3 + \bar{S}_3 S_2 S_1 \bar{S}_0 \bar{C}_3 \tag{6}$$
$$R_1=\bar{S}_3\bar{S}_2 S_1 S_0 C_3 + S_3 \bar{S}_2 \bar{S}_1 S_0 \bar{C}_3 \tag{7}$$
$$R_1=\bar{S}_3 S_2 \bar{S}_1 \bar{S}_0 C_3 + S_3 \bar{S}_2 S_1 S_0 \bar{C}_3 \tag{8}$$
$$R_1=\bar{S}_3 S_2 \bar{S}_1 S_0 C_3 + S_3 \bar{S}_2 S_1 \bar{S}_0 \bar{C}_3 \tag{9}$$
$$R_1=S_3 \bar{S}_2 \bar{S}_1 \bar{S}_0 C_3 + S_3 S_2 S_1 \bar{S}_0 \bar{C}_3 \tag{10}$$

Equations 6 and 10 may be combined to $$R_1=\bar{S}_2 S_1 \bar{S}_0 C_3 + S_2 S_1 \bar{S}_0 \bar{C}_3 \tag{11}$$

Equations 7 and 9 may be combined to $$R_1=\bar{S}_3 S_1 S_0 C_3 + S_3 \bar{S}_1 S_0 \bar{C}_3 \tag{12}$$

Equations 6–10 may be represented in matrix form as follows: In each case S is represented by "1" and $\bar{S}$ is represented by "0." * represents a digit which may be omitted.

$$R_1=\begin{bmatrix}0000\\0011\\0100\\0111\\1000\end{bmatrix}C_3+\begin{bmatrix}0110\\1001\\1010\\1101\\1110\end{bmatrix}\bar{C}_3=\begin{bmatrix}*000\\0*11\\0100\end{bmatrix}C_3+\begin{bmatrix}*110\\1*01\\1010\end{bmatrix}\bar{C}_3 \tag{13}$$

$$R_2=\begin{bmatrix}0001\\0010\\0011\\0100\\1001\end{bmatrix}C_3+\begin{bmatrix}0111\\1000\\1001\\1010\\1111\end{bmatrix}\bar{C}_3=\begin{bmatrix}*001\\001*\\0100\end{bmatrix}C_3+\begin{bmatrix}*111\\100*\\1010\end{bmatrix}\bar{C}_3 \tag{14}$$

$$R_3=\begin{bmatrix}0101\\0110\\0111\\1000\\1001\end{bmatrix}C_3+\begin{bmatrix}1011\\1100\\1101\\1110\\1111\end{bmatrix}\bar{C}_3=\begin{bmatrix}011*\\100*\\0101\end{bmatrix}C_3+\begin{bmatrix}1011\\11**\end{bmatrix}\bar{C}_3 \tag{15}$$

Figure 10:
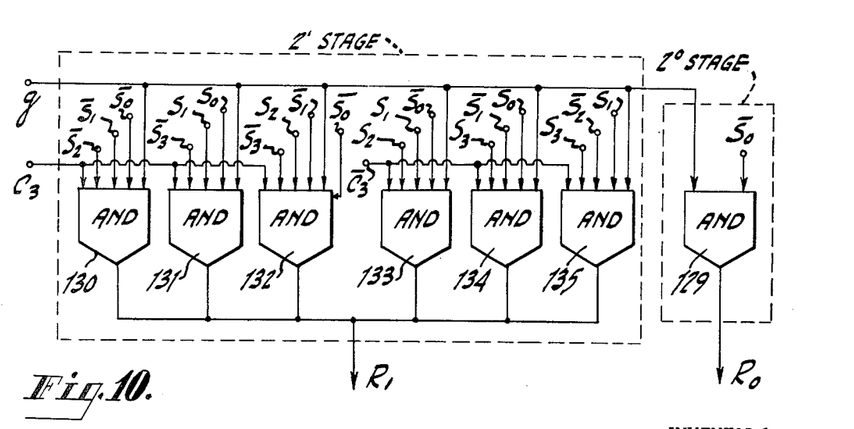
FIG. 10 is a more detailed showing of the $2^0$ and the $2^1$ stages of the excess 3 converter of FIG. 9.

The Boolean Equation 5 may be implemented by the "and" gate 129 of FIG. 10. One of the inputs to this "and" gate is $g$ and the other is $\bar{S}_0$. $g$, it will be recalled, is a machine instruction bit which is normally "zero" but which changes to "one" when the asynchronous adder has completed its addition. The output of "and" gate 129, therefore, is a binary bit $R_0$. Equations 8, 11 and 12 may be implemented by the six "and" gates 130–135. It is clear from the equations above that "and" gates 130 and 133 implement Equation 11; "and" gates 131 and 134 implement Equation 12 and "and" gates 132 and 135 implement Equation 8.

Figure 9:
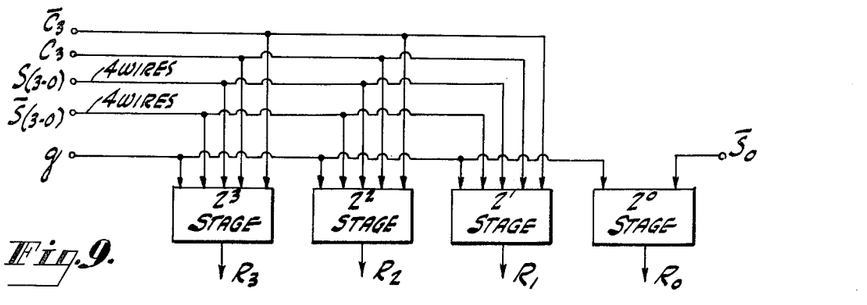
FIG. 9 is a block circuit diagram of the excess 3 converter of FIG. 4.

The single "and" gate 129 of the excess 3 converter represents the $2^0$ stage of the converter. Its output is $R_0$. The six "and" gates 130–135 represent the $2^1$ stage of the excess 3 converter. The output of these six gates is the binary bit $R_1$. The $2^2$ and $2^3$ stages of the converter are similar in structure to the $2^1$ stage and, therefore, are not illustrated. The various inputs to the "and" gates making up the $2^2$ and $2^3$ stages may readily be derived from Equations 14 and 15 above. The complete excess 3 converter is shown in block form in FIG. 9.

*Synchronous input switch*

Figure 11:
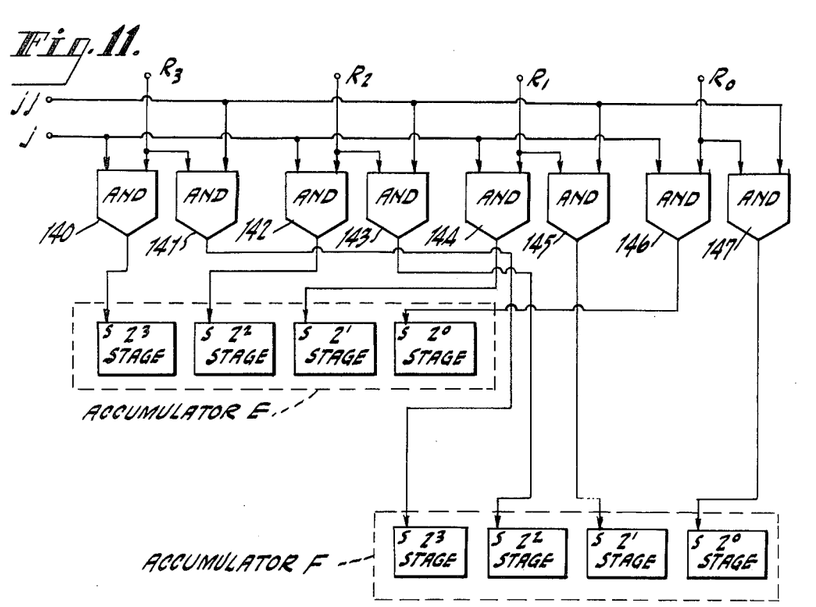
FIG. 11 is a block circuit diagram of the synchronous input switch and the accumulators of FIG. 4.

The synchronous input switch to the accumulators consists of eight "and" gates 140–147 as shown in FIG. 11. "And" gates 146 and 147 receive the $R_0$ output of the converter. "And" gates 144 and 145 receive the $R_1$ output of the converter and so on. In addition, "and" gates 140, 142, 144 and 146 receive the $j$ bit derived from a machine instruction bit and "and" gates 141, 143, 145 and 147 receive the $jj$ bit derived from an instruction bit.

In operation, when $j$ is made "one" and $jj$ remains "zero," the excess 3 coded word $R_0$–$R_3$ is applied through certain of the "and" gates to the stages in the accumulator E. When $jj$ is made "one" and $j$ remains "zero," the R word is applied through other of the "and" gates to the stages making up accumulator F.

*Machine instruction generator circuits (Block 54, FIG. 3)*

The machine instruction circuits include a large number of stages. However, for the purpose of the present discussion, only a number of these stages are shown. Also, for the purpose of this discussion it is explained how the machine instruction generator circuits produce in sequence, a machine instruction $MI_x$ followed by a machine instruction $MI_y$ in response to an instruction word 000.

The instruction $MI_x$ corresponds to the instruction signals $a$, $b$, $f$, $h$, as already discussed. In other words, this instruction commands the computer to add the contents of the $X_m$ register to the contents of the $Y_m$ register (FIG. 4), to convert the sum obtained, which is in excess 6 or excess 0 code, to excess 3 coded decimal form, and then to place this excess 3 sum in accumulator E. The machine instruction $MI_y$ commands the computer to add the contents of the register $X_L$ to the contents of register $Y_L$, to convert the sum obtained to excess 3 binary decimal code, and then to place the sum in accumulator F.

The circuit of FIG. 12 includes four "and" gates 150, 152, 154 and 156. "And" gates 150 and 152 supply their outputs to the set and reset terminals, respectively, of flip-flop 158. "And" gates 154 and 156 supply their outputs to the set and reset terminals of flip-flop 160. The outputs of the flip-flops are G, $\overline{G}$ and H, $\overline{H}$ and these are applied as inputs to the various "and" gates, as shown.

The return signal $r$ (see FIG. 4) is applied directly to "and" gates 154 and 156 and through inverter 162 to "and" gates 150 and 152. The third input to each "and" gate is the signal on lead 58.

Initially, the flip-flops 158 and 160 are reset. This means that $G=H=1$ and $\overline{G}=\overline{H}=0$. When the instruction word is 000, the binary bit "one" appears on lead 58. Under these conditions, "and" gate 150 is actuated and a "one" appears at lead 168. This "one" is applied to "or" gate 170 and is the $MI_x$ instruction. The output of "and" gate 150 also sets flip-flop 158 so that $\overline{G}$ becomes "one" and G becomes "zero."

By the time instruction $MI_x$ is completed, $r$, which has been delayed by delay means 73 (FIG. 4), changes from "zero" to "one." This inactivates "and" gate 150 and the instruction $MI_x$ becomes "zero." All of the inputs to gate 154 are now "one" so that "and" gate 154 is enabled and all other gates disabled. H changes to "zero" and $\overline{H}$ to "one."

Shortly after $MI_x$ becomes "zero," $r$ returns to "zero." At this time the flip-flop 160, which has been set by "and" gate 154 produces a $\overline{H}=1$ output. Accordingly, all of the inputs to "and" gate 152 are "one" and it produces a "one" output at lead 164. This "one" output is applied to "or" gate 166 and becomes the instruction $MI_y$. The output of "and" gate 152 also resets flip-flop 158 changing $\overline{G}$ to "zero" and G to "one."

Shortly after the last signal of the machine instruction $MI_y$ occurs, delayed $r$ becomes "one" inactivating "and" gate 152. At the same time, all of the inputs to "and" gate 156 are now "one" and this "and" gate produces a "one" output. This "one" output, $t=1$, may be applied to another machine instruction generator (not shown) in the computer. This other machine instruction generator may change the bit on lead 58 from "one" to "zero" thereby inactivating all of the "and" gates 150–156 and terminating the machine instruction $MI_y$. At this time the other two inputs to "and" gate 150 are now both "one" placing "and" gate 150 in condition to conduct when the binary bit on lead 58 again becomes "one." Thus, when the bit on lead 58 again becomes "one," the cycle discussed above is repeated.

The table below illustrates succinctly the operation of the circuit of FIG. 12.

| G | $\overline{G}$ | H | $\overline{H}$ | 58 | r | $\overline{r}$ | Conducting gate | Remarks |
|---|---|---|---|---|---|---|---|---|
| 1 | 0 | 1 | 0 | 0 | 0 | 1 | -------- | Initial conditions |
| 0 | 1 | 1 | 0 | 1 | 0 | 1 | 150 | 58 becomes 1<br>$MI_x$ becomes 1 |
| 0 | 1 | 0 | 1 | 1 | 1 | 0 | 154 | $\overline{G}$ becomes 1<br>r becomes 1<br>$\overline{H}$ becomes 1<br>H becomes 0<br>150 disabled<br>$MI_x$ becomes 0 |
| 1 | 0 | 0 | 1 | 1 | 0 | 1 | 152 | r becomes 0<br>G becomes 1<br>$MI_y$ becomes 1<br>154 disabled |
| 1 | 0 | 1 | 0 | 1 | 1 | 0 | 156 | r becomes 1<br>H becomes 1<br>152 disabled<br>$MI_y$ becomes 0<br>t becomes 1 |
| 1 | 0 | 1 | 0 | 0 | 0 | 1 | -------- | 58 becomes 0<br>r becomes 0 |

The purpose of the "or" gates 166 and 170 is to permit other circuits (not shown) to initiate the machine instruction $MI_x$ or $MI_y$, as desired. The inputs to the "or" gates from these other circuits are not shown.

The generation of the machine instruction $MI_z$ is not shown. The circuit can be similar to the one of FIG. 12. Since the principle of generation is the same, this circuit is not discussed further.

What is claimed is:

1. In combination, at least three data processing system stages connected in cascade for performing succeeding operations on a data word applied to the first of the stages, each said stage including an input terminal to which a start signal may be applied for starting its operation; an operations control system transmitting concurrent direct current levels towards each of said stages; and a plurality of circuits, one at the input terminal of each of said stages except the first, each for applying a start signal to the stage to which it is connected in response to the receipt of one of said direct current levels and a signal which indicates that the next previous stage has completed its operation, said first stage receiving one of said direct current levels directly at its input terminal.

2. The combination set forth in claim 1, and further including a circuit in one of said stages for sensing the presence of binary bits and their complements at the output of said stage as an indication of the completion of the operation performed by said stage.

3. The combination set forth in claim 1 in which at least some of said stages are asynchronous stages and the remaining stages are synchronous stages.

References Cited by the Examiner

UNITED STATES PATENTS

| | | | |
|---|---|---|---|
| 2,822,131 | 2/1958 | Algrain | 235—164 |
| 3,015,444 | 1/1962 | Schneider | 235—164 |
| 3,021,067 | 2/1962 | Jahn | 235—164 |
| 3,058,656 | 10/1962 | Pomerene | 235—153 |
| 3,067,937 | 12/1962 | Hinkein et al. | 235—157 |

ROBERT C. BAILEY, *Primary Examiner.*

WALTER W. BURNS, JR., MALCOLM A. MORRISON,
*Examiners.*